Dec. 23, 1952      F. J. BOTT      2,622,747
APPARATUS FOR LOADING AND UNLOADING ARTICLES FROM RETORTS
Filed March 12, 1948      5 Sheets-Sheet 1

Inventor
FRANCIS J. BOTT,
By Ritter, Mechlin & Muir
Attorneys

Dec. 23, 1952     F. J. BOTT     2,622,747
APPARATUS FOR LOADING AND UNLOADING ARTICLES FROM RETORTS
Filed March 12, 1948     5 Sheets-Sheet 2

Inventor
FRANCIS J. BOTT,
By Ritter, Mechlin & Muir
Attorneys

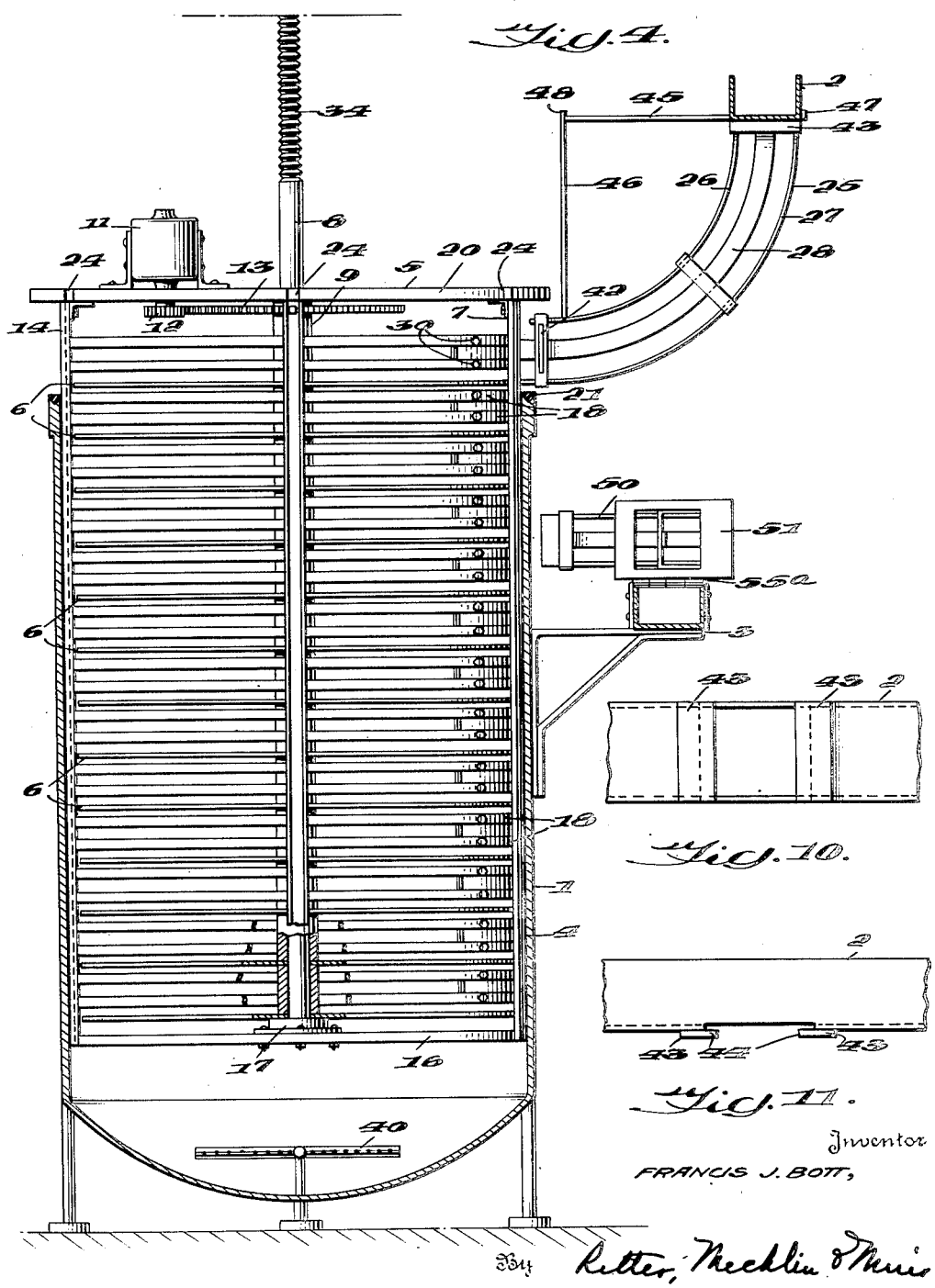

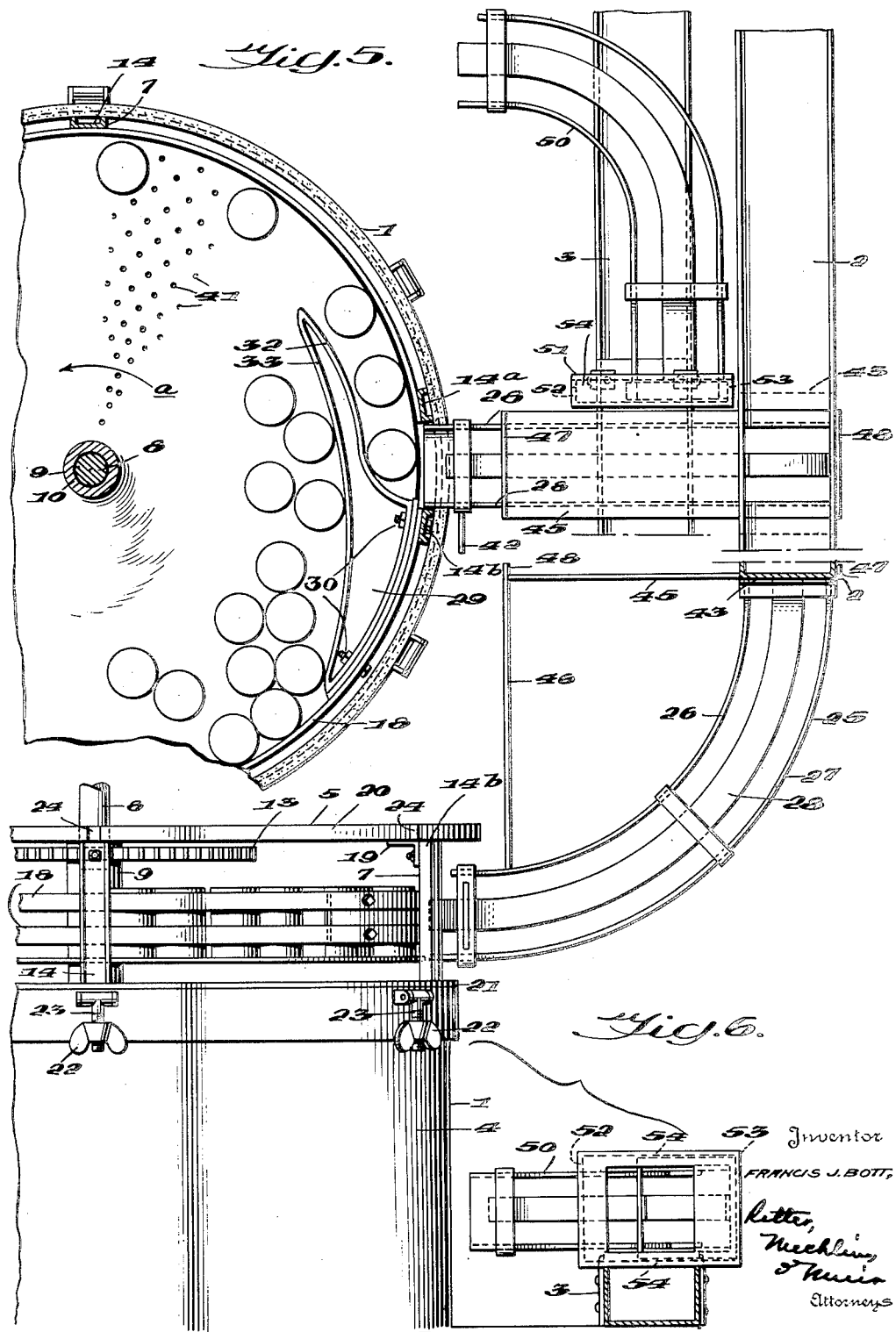

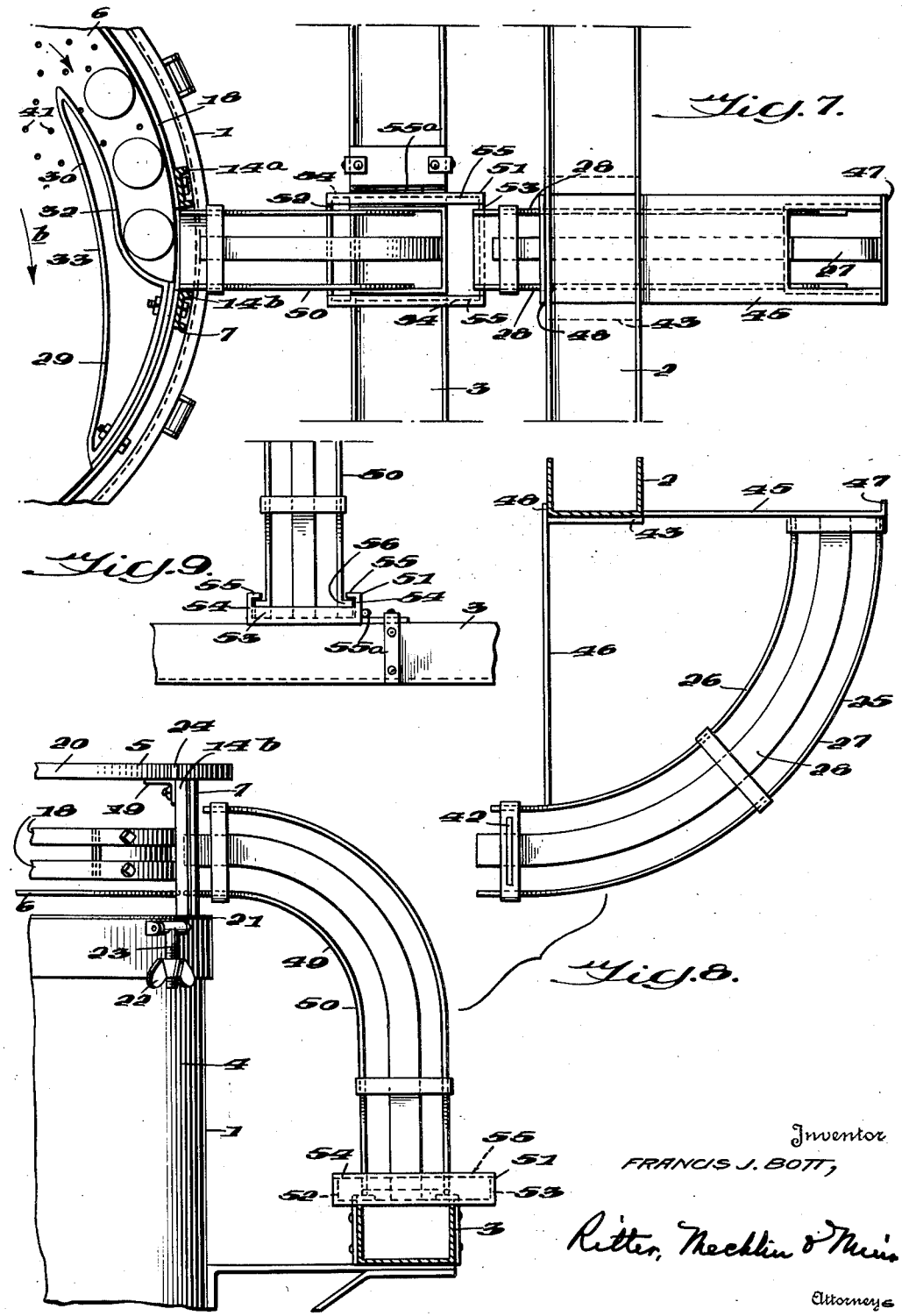

Patented Dec. 23, 1952

2,622,747

UNITED STATES PATENT OFFICE 2,622,747

APPARATUS FOR LOADING AND UNLOADING ARTICLES FROM RETORTS

Francis J. Bott, Ogden, Utah, assignor to Berlin Chapman Company, Berlin, Wis., a corporation of Wisconsin Application March 12, 1948, Serial No. 14,508

5 Claims. (Cl. 214—21)

My invention relates to apparatus for handling articles and it is particularly useful in connection with the processing of food within cans or glass containers.

A principal object of my invention is to provide an apparatus to which articles may be easily delivered before being placed in a retort and from which the articles may be easily removed after being withdrawn from the retort.

A primary feature of the invention consists in successively moving a series of superposed disks downwardly into a retort to enable each disk to be loaded with a predetermined number of articles before being lowered into the retort.

Another feature of the invention consists in providing a vertical retort into which a series of superposed disks are moved intermittently downwardly into the retort and in further providing means for loading each of the disks with a plurality of articles.

A further feature of the invention consists in intermittently lowering a plurality of superposed disks into a substantially vertical retort, downward movement of the disks being arrested when each is adjacent a delivery station from which articles are loaded onto the respective disks.

A still further feature of the invention consists in providing a set of superposed disks which are intermittently lowered into a retort and after a desired time intermittently raised from the retort, each of the disks being rotatable in one direction to load the articles thereon and each of the disks being rotatable in the opposite direction to unload the articles therefrom.

A still further feature of the invention consists in providing vertically movable disks for respectively supporting articles thereon and in mounting the disks within a cage or the like which affords means for guiding the cage downwardly into and upwardly out of a retort and prevents the cage from rotating within the retort while not interfering with the rotation of the disks.

Other and more specific features of the invention, residing in advantageous forms, combinations and relations of parts, will hereinafter appear and be pointed out in the claims.

In the drawings,

Figure 4 is a cross-sectional view on the same scale as Figure 3 of one of the retorts and its associated article carrying means in the position it occupies during the loading of the uppermost disk thereof, the loading chute being shown in operative position and the unloading chute in inoperative position.

Figure 5 is an enlarged fragmentary plan view of the construction illustrated in Figure 4 with the cover removed showing the position of parts during loading of the retorts.

Figure 6 is a side elevational view, partly in section, of the construction illustrated in Figure 5.

Figure 7 is an enlarged fragmentary horizontal sectional view of the apparatus when it is arranged to unload the articles from the disks.

Figure 8 is a side elevational view, partly in section, of the construction illustrated in Figure 7.

Figure 9 is a detail elevational view of the pivotal connection between the discharge or unloading chute and the unloading conveyer.

Figure 10 is a fragmentary under side view of one of the loading conveyors or troughs showing one of the openings through which articles pass into a loading chute.

Figure 11 is a side view of the construction illustrated in Figure 10.

Figure 1:
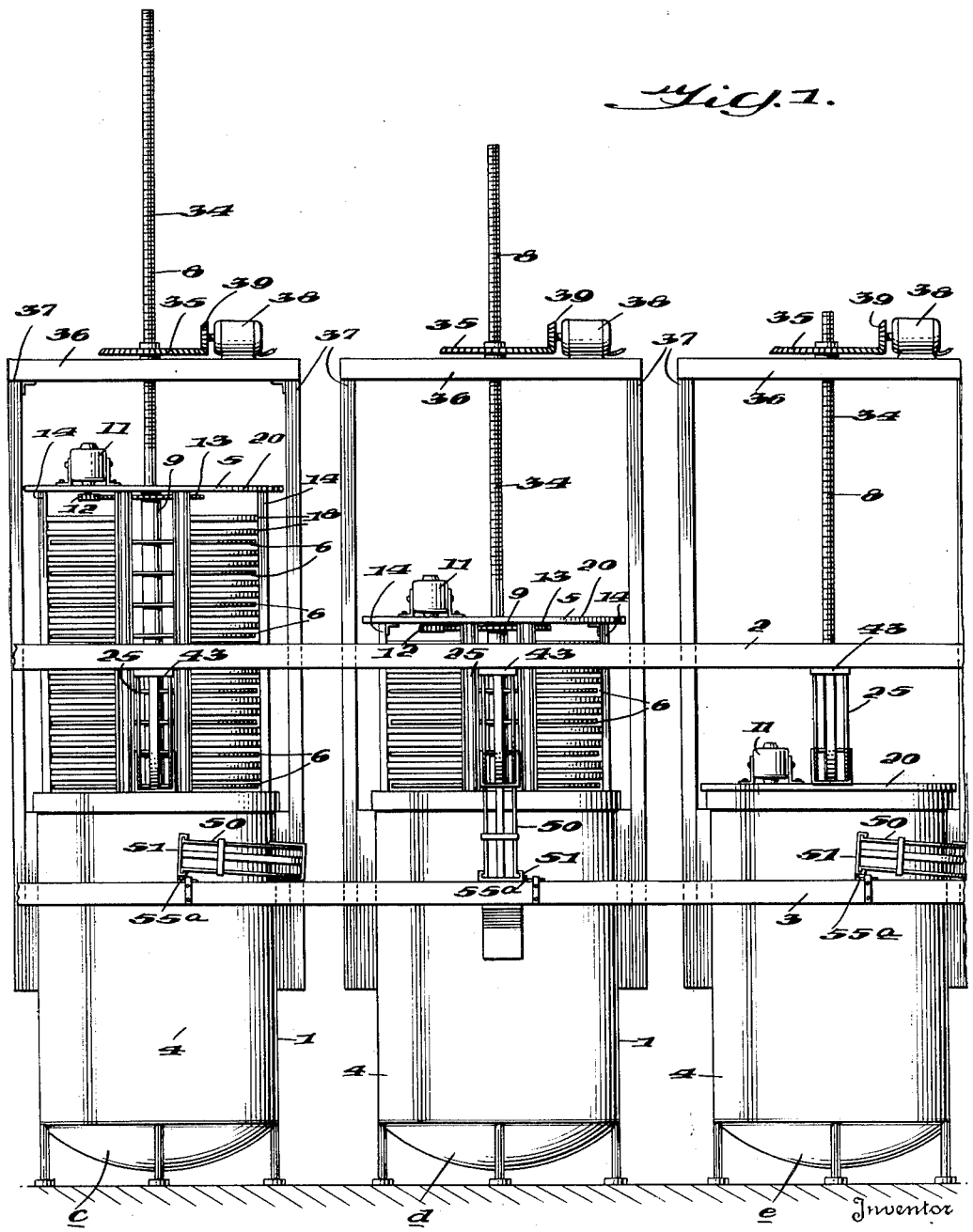
Figure 1 is a side view, more or less diagrammatic, of a battery of three units involving the present invention.
Figure 2:
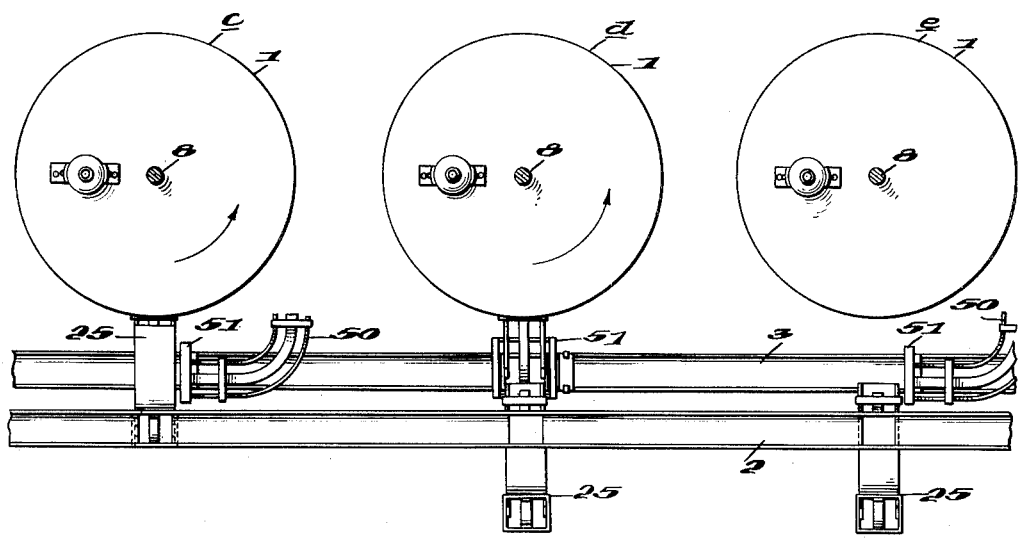
Figure 2 is a plan view, with the gears removed, of the structure illustrated in Figure 1.
Figure 3:
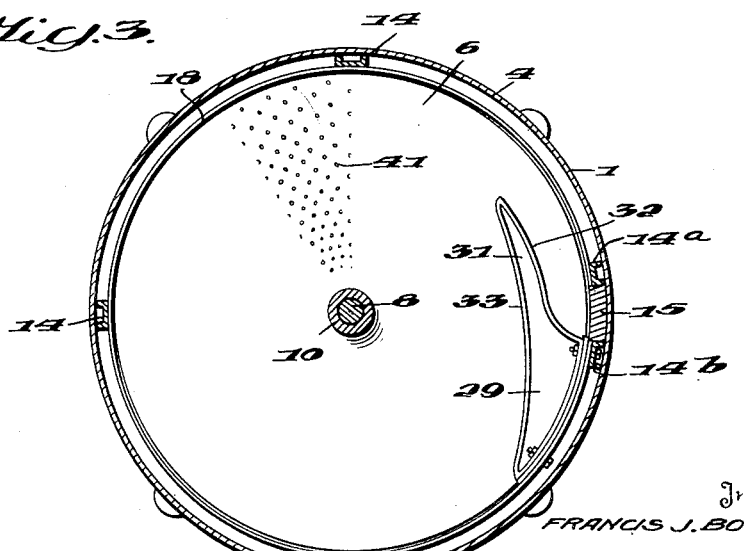
Figure 3 is an enlarged transverse horizontal sectional view of one of the retorts in which the means for supporting the articles is disposed.

Referring more particularly to the drawings, 1 indicates a single retort unit which may be used either by itself or, as shown in Figures 1 and 2, in combination with other similar units. Whether used as a separate unit or in combination with other similar units, articles are carried to a position of delivery to one or more of the retort units by a conveyer 2 and are carried from a position of removal from one or more of the retorts by a removal conveyor 3 for delivery to a subsequent station.

Figure 1 shows a plurality or battery of retort units which are served by the same delivery and removal conveyors 2 and 3, respectively, but it is to be understood that only one of the retort units may be used if desired and that, in such case, articles may be delivered to and removed from a single unit by conveyors of the same construction as those shown. As the retort units are identical, the construction of one need only be described.

In Figure 4, wherein 4 designates the retort body, a single unit is shown in vertical section which, in addition to the retort itself, has an assemblage 5 which is capable of being lowered and then subsequently raised in the retort. Each assemblage comprises a set of superposed disks 6 and a cage-like device 7.

The superposed disks which are rotatable within the cage-like device are apertured at their centers to receive a shaft 8. Surrounding the shaft and rotatable independently thereof is a tubular-like member 9 formed by a plurality of thimbles 10 which are interposed between the disks and thereby maintain them in proper vertically spaced position. The ends of the thimbles are suitably secured to the adjacent disks, as by welding, and in this manner the tubular member 9 is formed with the disks securely fastened thereto.

Rotation of the tubular member and the attached disks may be accomplished in any suitable manner, such, for example, as by means of an electric motor 11 which drives a gear 12 in mesh with a larger gear 13 which is rigid with the tubular member 9.

The cage-like device 7 in which the rotatable disks are carried has a plurality of upright frame members 14 which may advantageously be of channel-shape. Two of these channel members 14a and 14b engage opposite sides of a bar-like member 15 rigidly secured to the inner face of the circular wall of the retort body. By engaging opposite faces of the bar 15, the cage device is prevented from rotating within the retort and the channel members 14a and 14b define the sides of an opening through which articles are either delivered to or removed from the disks 6.

At their lower ends, two or more of the channel members 14 are connected by a transversely extending element 16 for supporting the bearing 17 in which the lower end of shaft 8 is journaled in any well known or suitable manner, whereby the entire weight of the cage device and the disks is supported by the shaft.

Any suitable material, such as band iron 18, may be secured to the inner faces of the channel members 14 adjacent each disk so as to, in effect, provide the periphery of each disk with an upstanding bounding wall or edge. In the form of the invention illustrated, two straps of band iron are provided for each disk and each band extends continuously from the channel member 14a to the channel member 14b.

At their upper ends, the channel members 14 are rigidly connected to brackets 19 or the like rigid with the cover or lid 20 of the retort. As is conventional, the upper edge of the circular wall of the retort is provided with a gasket 21 for cooperating with the under side of the cover 20. The cover may be securely clamped to the retort by wing nuts 22 which, after the bolts 23 on which they are threaded are inserted in suitable recesses 24 in the cover, may be tightened the desired amount.

Articles, such as cans or bottles are delivered to each disk through a chute 25 from the delivery conveyor 2 or trough which is inclined slightly. The articles, which are preferably cylindrical, roll on their sides in the delivery conveyor and, in order that they will be delivered to the disks in a standing, upright position, the delivery chute 25 is arcuate as shown in Figures 4 and 6. The chute may be of any suitable construction having top and bottom guide walls 26 and 27, respectively, and side retaining walls 28. Before any one of the disks are loaded, cage 7 and the disks 6 are raised from the associated retort until the lowermost disk is approximately level with the top of the retort. The bottom wall 27 of the delivery or loading chute is then positioned a slight distance above the disk to be loaded so as to eliminate the possibility of an article being loaded from catching on the peripheral edge of the adjacent disk as the article is being transferred from the chute to the disk.

The articles loaded on the disks are properly guided thereon by dividers or the like 29, one divider being provided for each disk and being secured in proper position by any suitable means, such as bolts 30. When an article descends the delivery chute for loading on the disks, the disks are rotated in the direction of the arrow designated a in Figure 5 so as to move the articles thereon in the same direction away from the discharge end of the loading chute. Each divider has a finger portion 31 affording a face 32 for initially guiding the articles delivered to the associated disk to adjacent the periphery thereof (as seen in Figure 5) where, due to continued rotation of the disk, they will remain until the loaded articles engage the opposite or inner face 33 of the divider, whereupon they are caused to gradually approach the center of the disk. When the bottom disk is loaded, a gate 42 is pushed into the delivery chute 25 thereby preventing additional articles from discharging therefrom.

When loading of the lowermost disk is stopped, shaft 8 is rotated for a predetermined time to lower the assemblage 5 and thereby bring the disk next above the lowermost one into cooperative association with the delivery chute. This vertical movement of the disks may be accomplished by providing the upper portion of the shaft 8 with screw threads designated 34 with which a bevel gear 35 having a centrally threaded opening cooperates. The bevel gear may be revolubly mounted on a suitable transverse support 36 carried by uprights 37 secured to the sides of the retort body. Motion is imparted to the bevel gear 35 by a reversible motor 38, also carried by the transverse support 36, the motor having a small bevel gear 39 in mesh with the bevel gear 35. Thus it will be seen that, when the bevel gear 35 is rotated in one direction, shaft 8 moves downwardly and, when rotated in the opposite direction, the shaft is caused to move upwardly. Motor 38 is, therefore, actuated intermittently in lowering the assemblage 5 into the retort so as to successively bring the disks 6 into cooperative association with the delivery chute. In this manner all of the superposed disks may be loaded to any desired extent. When the next disk assumes an elevation opposite the discharge end of the delivery chute 25, the gate 42 is withdrawn to permit loading of that disk. Movement of the gate into and out of operative position continues during the loading of the disks. After the uppermost disk is loaded, the interior assemblage 5 is again lowered into the retort until the cover 20 engages the gasket 21, after which the cover is securely fastened to the retort as heretofore explained.

With the cover properly fastened on the retort, steam is admitted to the interior of the retort by suitable pipes 40 located in the bottom portion thereof. Since each disk is preferably perforated, as indicated at 41, the steam in the retort is free to circulate uniformly around all the articles on the disks, and to insure this uniform treatment the disks preferably rotate during the entire time the cover is clamped to the retort. If the articles on the disks contain food which is to be cooked within the retort, it will be obvious to those skilled in the art that, with this construction the cooking operation will require considerably less time than heretofore.

Needless to say that, after the uppermost disk has been loaded, the delivery or loading chute 25 is withdrawn from between the channel members 14a and 14b, thereby enabling the cover of the retort to be lowered into engagement with the gasket at the upper edge thereof without injuring the delivery chute. Withdrawal of the delivery chute to permit the retort to be closed is effected by moving it into an inoperative position as shown in Figure 8.

The delivery chute is slidably supported on the under side of the conveyer or trough by two track-like members 43 which comprise members mounted on opposite sides of the opening in the conveyer or trough, each having an inwardly extending portion 44 for slidably supporting a horizontal plate portion 45 which is rigidly secured to the upper end of the chute. The plate 45 is apertured above the chute so that, when it is moved into operative loading position, the aperture in the plate coincides with the aperture or opening in the conveyer. The upper surface of the plate 45 is in the same plane as the upper portions of the bottom of the conveyer adjacent the chute so that, when the chute is in inoperative position, cans or other articles which roll in the trough will pass evenly over the plate.

Extending vertically and connecting the inner end of plate 45 with a portion of the delivery chute 25 is a bar 46 affording a handle by which the chute may be easily moved from either operative to inoperative position or inoperative to operative position. Stops 47 and 48 respectively are preferably provided to limit sliding of the plate 45 and therefore the delivery chute 25, stop 47 limiting inward movement of the plate and stop 48 limiting outward movement thereof. Also when stop 47 engages the outside of the delivery trough, the person who moves the chute 25 from one position to another knows that the opening in the plate 45 carried by the trough is in registry with the opening in the delivery conveyer.

After a prescribed length of time, the wing nuts 22 are unloosened and the disks, together with the cage-like device, are raised from the retort by the reversible motor 33. The disks are first raised so as to bring the uppermost one to a position slightly above or level with the lower wall 49 of a discharge chute 50. By rotating the disks in the direction indicated by the arrow b, which is opposite to the direction of rotation of the disks during loading, the articles are guided by the dividers 31 into the discharge chute 50. During unloading of the disks, the delivery chutes 25 are in the inoperative positions indicated in Figures 7 and 8.

Unloading of the other superposed disks is accomplished in the same manner as described in connection with the uppermost disk.

The discharge chute is slidably mounted in a member 51 which is provided with front and back walls 52 and 53, respectively, and with side walls 54. As clearly shown in Figure 9, the upper ends of the side walls 54 are flanged inwardly as indicated at 55 to overlie the enlarged lower end 56 of the discharge chute 50. The member 51 in which the lower end of the discharge chute is slidably mounted is pivotally connected, as at 55a, to the unloading conveyer or trough 3 so that the plate may be easily moved to and from a position overlying the conveyer.

By having the lower end of the discharge chute slidably mounted in member 51 which is hingedly connected to the unloading conveyer or trough 3, the chute may be readily moved from the inoperative position in which it is shown in Figure 5 into the operative position shown in Figure 7. It will be understood that during the unloading operation, the discharge chute is moved from its inoperative position by first raising it upwardly, thereby causing pivotal movement of member 51. The upper end of the discharge chute is then opposite the opening between channel members 14a and 14b and can, therefore, be moved into the position shown in Figure 7 by merely sliding it forwardly with respect to member 51.

When a plurality of the retort units are used, as shown in Figures 1 and 2, the sequence of loading and unloading the disks and cooking within the retort may be varied to suit individual desires. In Figure 1 the disks for retort c are being loaded, the disks for retort d are being unloaded and retort e is shown with the cover on top of the retort indicating that all of the disks are confined within the retort. The loading of delivery chute 25 for retort c is obviously disposed in operative position delivering the desired number of articles to each disk. The loading or delivery chutes for retorts d and e appear to be in operative position but the fact is that they have been moved to inoperative position. The disks of retort d are being unloaded as indicated by the upright position of the discharge chute 50, while both chutes are shown in inoperative position in connection with retort e.

By having the upper surface of plate 45 in the same plane as the upper surface of the delivery trough 2, it will be appreciated that, if retort c is fully loaded before retorts e and d are loaded, the cans or other articles which are to be loaded may readily roll along the trough to either retort d or e over the closed opening of the delivery chute for retort c. The plate member 45 of the delivery chute for retort d will, of course, act in a manner similar to the corresponding plate of retort c provided both retorts c and e have been loaded.

The conveyers or troughs 2 and 3 are slightly inclined downwardly, as viewed in Figure 1. This inclination is sufficient to cause the cans to roll along the conveyer troughs of their own volition. When using a plurality of retorts, as shown in Figure 1, the cans on the delivery trough will roll therealong until they come to an opening through which they may pass to a delivery chute of one of the retorts, and in the unloading operation as the cans pass through the discharge chutes 50 they fall into the slightly inclined conveying trough 3 and, therefore, move away from the discharge end of the chutes.

It is to be particularly noted, however, that a single retort unit may be employed; but even with the single retort it will be necessary to provide loading and unloading chutes together with their associated unloading and loading conveying troughs.

Various modifications may be made in the embodiment of the invention illustrated and described without departing from the spirit and scope of the appended claims.

What I claim is:

1. In a can handling device, a series of superimposed vertically spaced can supporting disks each having its major upper surface horizontally disposed and free from obstruction for unrestrained lateral movement of a mass of upright cylindrical cans resting thereon, a rotary tubular central upright shaft drivingly secured to said disks to support and maintain the same in vertically spaced relation, a central non-rotatable shaft providing a guide bearing within said tubular shaft and also having a thrust bearing suspended from its lower end for rotatably supporting said disks, upright parallel frame members secured at their lower ends to said thrust bearing and extending upwardly across the peripheries of said disks while being interconnected at their upper ends above said disk series, an annular wall secured to said members adjacent to and above the periphery of each disk, each of said walls having an opening therein provided with a fixed can divider reaching inwardly over the peripheral edge portion only of the adjacent disk, a retort for receiving said disks and said walls, means coacting with said tubular shaft for simultaneously revolving said disks, and means coacting with said central shaft for simultaneously raising or lowering said disks and said walls relative to said retort.

2. In a can handling device, a series of superimposed vertically spaced can supporting disks each having its major upper surface horizontally disposed and free from obstruction for unrestrained lateral movement of a mass of upright cylindrical cans resting thereon, a rotary tubular central upright shaft drivingly secured to said disks to support and maintain the same in vertically spaced relation, a central non-rotatable shaft providing a guide bearing within said tubular shaft and also having a thrust bearing suspended from its lower end for rotatably supporting said disks, upright parallel frame members secured at their lower ends to said thrust bearing and extending upwardly across the peripheries of said disks while being interconnected at their upper ends above said disk series, an annular wall secured to said members adjacent to and above the periphery of each disk, each of said walls having an opening therein provided with a fixed can divider reaching inwardly over the peripheral edge portion only of the adjacent disk, a retort for receiving said disks and said walls, a reversible motor for simultaneously revolving said tubular shaft and said disks in either direction, and means coacting with said central shaft for succesively lowering said disks during the reception of cans and while rotating in one direction and for subsequently successively raising the disks during the removal of the cans and while rotating in the opposite direction.

3. In a can handling device, a series of superimposed vertically spaced can supporting disks each having its major upper surface horizontally disposed and free from obstruction for unrestrained lateral movement of a mass of upright cylindrical cans resting thereon, a rotary tubular central upright shaft drivingly secured to said disks to support and maintain the same in vertically spaced relation, a central non-rotatable shaft providing a guide bearing extending throughout the interior of said tubular shaft and also having a thrust bearing and a lower transverse supporting element suspended from its lower end for rotatably supporting said disks, upright parallel frame members secured at their lower ends to said lower supporting element and extending upwardly across the peripheries of said disks while being interconnected at their upper ends above said disk series by an upper cover element, an annular wall secured to said members adjacent to and above the periphery of each disk, each of said walls having an opening therein provided with a fixed can divider reaching inwardly over the peripheral edge portion only of the adjacent disk, a retort for receiving said disks and said walls, means carried by said upper cover element and coacting with said tubular shaft for simultaneously revolving said disks, and means coacting with said central shaft for simultaneously raising or lowering said disks and said walls relative to said retort.

4. In a can handling device, a series of superimposed vertically spaced can supporting disks each having its major upper surface horizontally disposed and free from obstruction for unrestrained lateral movement of a mass of upright cylindrical cans resting thereon, a rotary tubular central upright shaft drivingly secured to said disks to support and maintain the same in vertically spaced relation, a central non-rotatable shaft providing a guide bearing within said tubular shaft and also having a thrust bearing suspended from its lower end for rotatably supporting said disks, upright parallel frame members secured to said thrust bearing and extending upwardly across the peripheries of said disks while being interconnected at their upper ends above said disk series, an annular wall secured to said members adjacent to and above the periphery of each disk, each of said walls having an opening therein provided with a fixed can divider extending inwardly over the peripheral edge only of the adjacent disk and each of said dividers having an arcuate inner surface parallel to the adjacent disk periphery and an outer surface disposed spirally of said disk periphery, a retort for receiving said disks and said walls, means coacting with said tubular shaft for simultaneously revolving said disks, and means coacting with said central shaft for simultaneously raising or lowering said disks and said walls relative to said retort.

5. In a can handling device, a series of superimposed vertically spaced can supporting disks each having its major upper surface horizontally disposed and free from obstruction for unrestrained lateral movement of a mass of upright cylindrical cans resting thereon, a rotary tubular central upright shaft drivingly secured to said disks to support and maintain the same in vertically spaced relation, a central non-rotatable shaft providing a guide bearing within said tubular shaft and also having a thrust bearing suspended from its lower end for rotatably supporting said disks, upright parallel frame members secured to said thrust bearing and extending upwardly across the peripheries of said disks while being interconnected at their upper ends above said disk series, an annular wall secured to said members adjacent to and above the periphery of each disk, each of said walls having an opening therein provided with a fixed can divider extending inwardly over the peripheral edge only of the adjacent disk and each of said dividers having an arcuate inner surface parallel to the adjacent disk periphery and an outer surface disposed spirally of said disk periphery, a retort for receiving said disks and said walls, a reversible motor for simultaneously revolving said tubular shaft and said disks in either direction, and means coacting with said central shaft for successively lowering said disks during the reception of cans and while rotating in one direction and for subsequently successively raising the disks during the removal of the cans and while rotating in the opposite direction.

FRANCIS J. BOTT.

REFERENCES CITED

The following references are of record in the file of this patent:

UNITED STATES PATENTS

| Number | Name | Date |
|---|---|---|
| 2,278,434 | Fahey | Apr. 7, 1942 |
| 2,353,393 | Fahey | July 11, 1944 |